US010781902B2

(12) United States Patent
Tsujimura et al.

(10) Patent No.: US 10,781,902 B2
(45) Date of Patent: Sep. 22, 2020

(54) LOCK CONTROL DEVICE OF DRIVE GEAR AND LOCK CONTROL DEVICE OF ACTUATOR

(71) Applicant: SINFONIA TECHNOLOGY CO., LTD., Tokyo (JP)

(72) Inventors: Masaharu Tsujimura, Tokyo (JP); Katsuaki Saito, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 223 days.

(21) Appl. No.: 15/940,363

(22) Filed: Mar. 29, 2018

(65) Prior Publication Data
US 2018/0283512 A1  Oct. 4, 2018

(30) Foreign Application Priority Data

Mar. 29, 2017  (JP) ................ 2017-064865

(51) Int. Cl.
*F16H 35/00* (2006.01)
*F16H 1/02* (2006.01)
(Continued)

(52) U.S. Cl.
CPC ............. *F16H 35/00* (2013.01); *F16D 11/10* (2013.01); *F16D 63/006* (2013.01); *F16H 1/02* (2013.01);
(Continued)

(58) Field of Classification Search
CPC .... F16H 35/00; F16H 1/02; F16H 2061/0474; F16H 1/20; F16H 2035/006; F16H 3/20; F16H 3/22; F16D 11/10
See application file for complete search history.

(56) References Cited

U.S. PATENT DOCUMENTS 2,570,720 A * 10/1951 Rumpf ..................... B23Q 5/14
74/342
6,415,675 B1 * 7/2002 Schneider .............. B62D 33/08
188/69
(Continued)

FOREIGN PATENT DOCUMENTS

JP  2002-243398 A  8/2002

OTHER PUBLICATIONS

Extended European Search Report dated Aug. 1, 2018, issued in counterpart European Application No. 18164219.0. (6 pages).

*Primary Examiner* — Jeremy R Severson
(74) *Attorney, Agent, or Firm* — Westerman, Hattori, Daniels & Adrian, LLP

(57) ABSTRACT

For a gear train GL including a drive gear 33 and an idler gear 34 engaged with each other and a lock gear 35, provided are a first drive means 3A configured to linearly drive the lock gear 35 in forward and backward directions, a second drive means 3B configured to rotationally drive the drive gear 33 in normal and reverse directions, and a controller C configured to control the both drive means 3A and 3B. The controller C starts driving the lock gear 35 at the time of an unlocking operation, from an engagement position toward the disengagement position through the first drive means 3A, and when the drive is started, the controller C drives the drive gear 33 into one of normal and reverse directions and into the other direction through the second drive means 3B with a polarity reversal in a predetermined cycles T1 and T2.

8 Claims, 12 Drawing Sheets

(51) Int. Cl.
  *F42B 10/66* (2006.01)
  *F16D 11/10* (2006.01)
  *F16H 3/22* (2006.01)
  *F16D 63/00* (2006.01)
  *F16H 61/04* (2006.01)
  *F16D 121/24* (2012.01)
  *F16H 1/20* (2006.01)

(52) U.S. Cl.
  CPC .............. *F16H 3/22* (2013.01); *F42B 10/666* (2013.01); *F16D 2121/24* (2013.01); *F16H 1/20* (2013.01); *F16H 2035/006* (2013.01); *F16H 2061/0474* (2013.01)

(56) References Cited

U.S. PATENT DOCUMENTS

| | | | |
|---|---|---|---|
| 8,914,209 B2 * | 12/2014 | Mori | F16H 61/0437 |
| | | | 701/60 |
| 9,170,526 B2 * | 10/2015 | Suzuki | G03G 15/0822 |
| 2005/0115346 A1 * | 6/2005 | Sakamoto | F16H 3/126 |
| | | | 74/335 |
| 2014/0214294 A1 | 7/2014 | Mori et al. | |

* cited by examiner

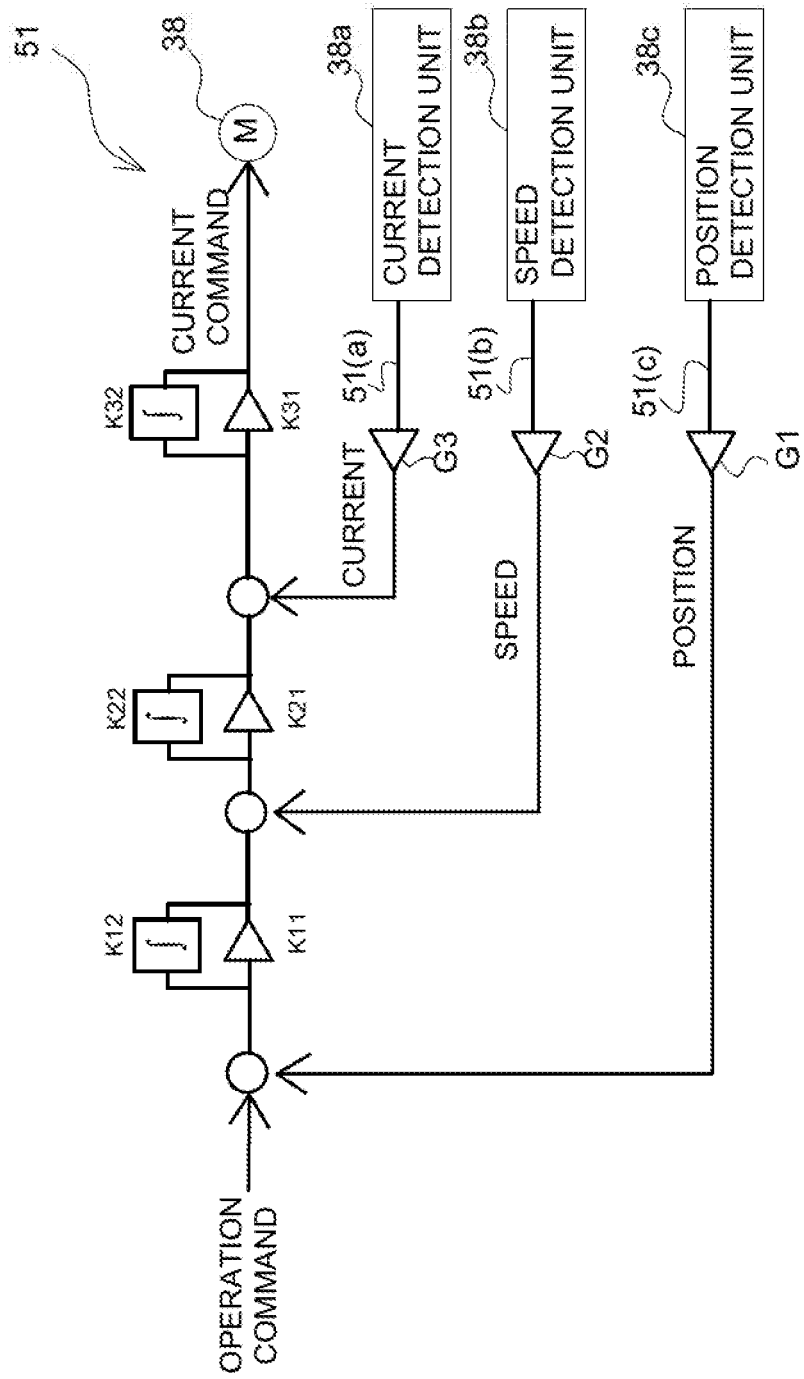

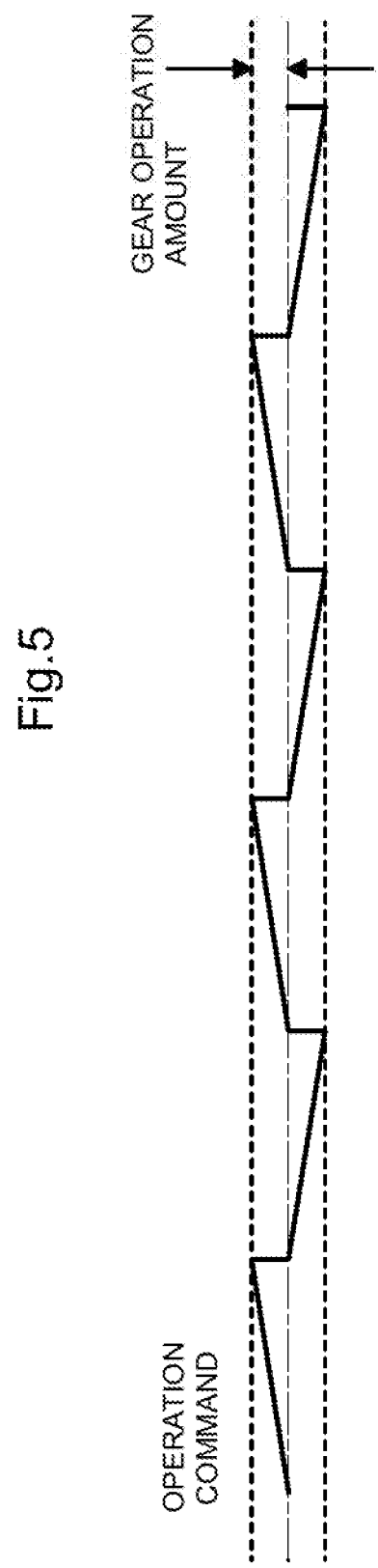

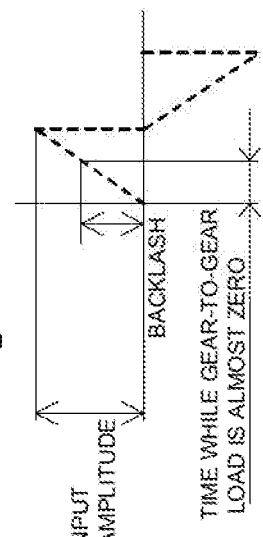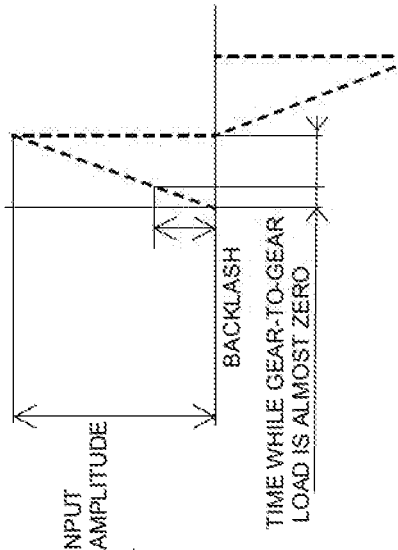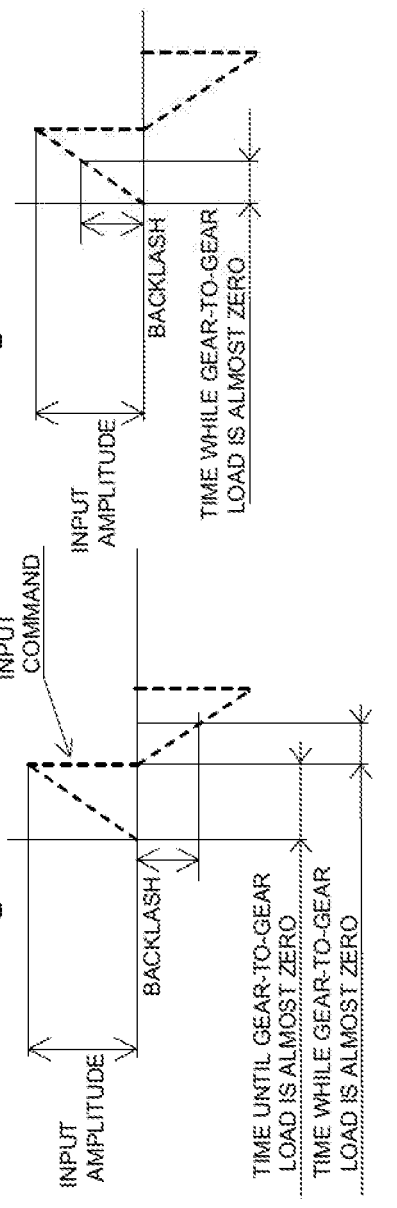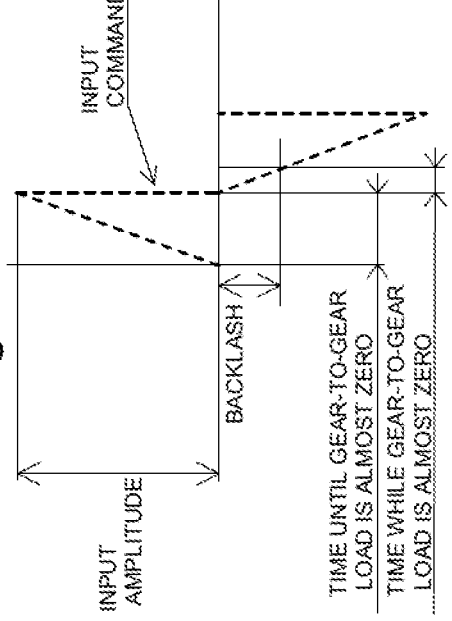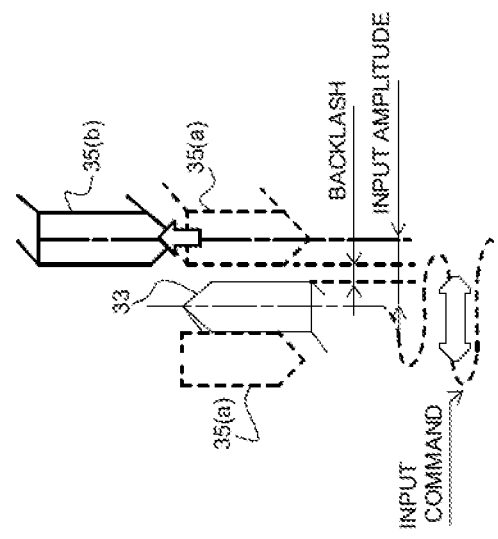

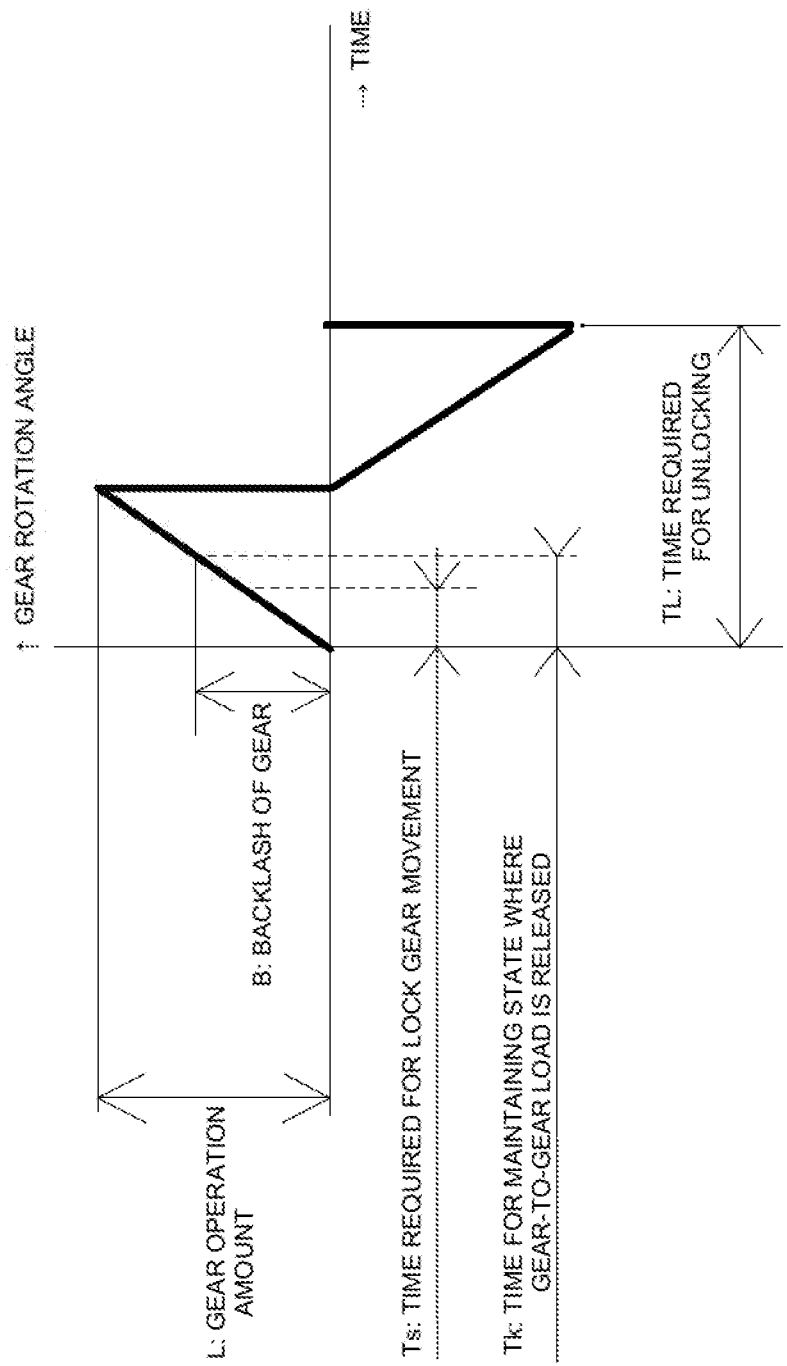

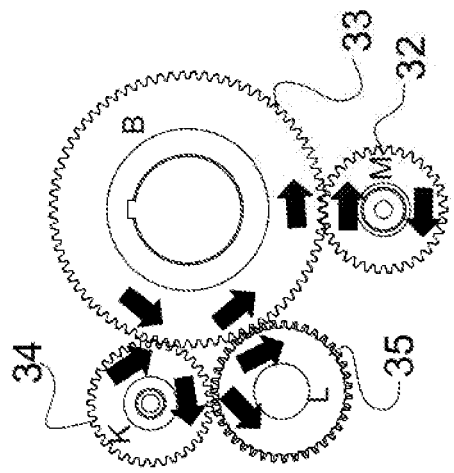
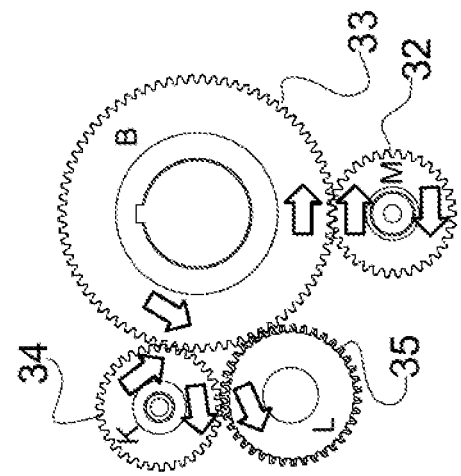
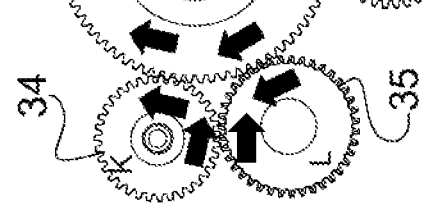

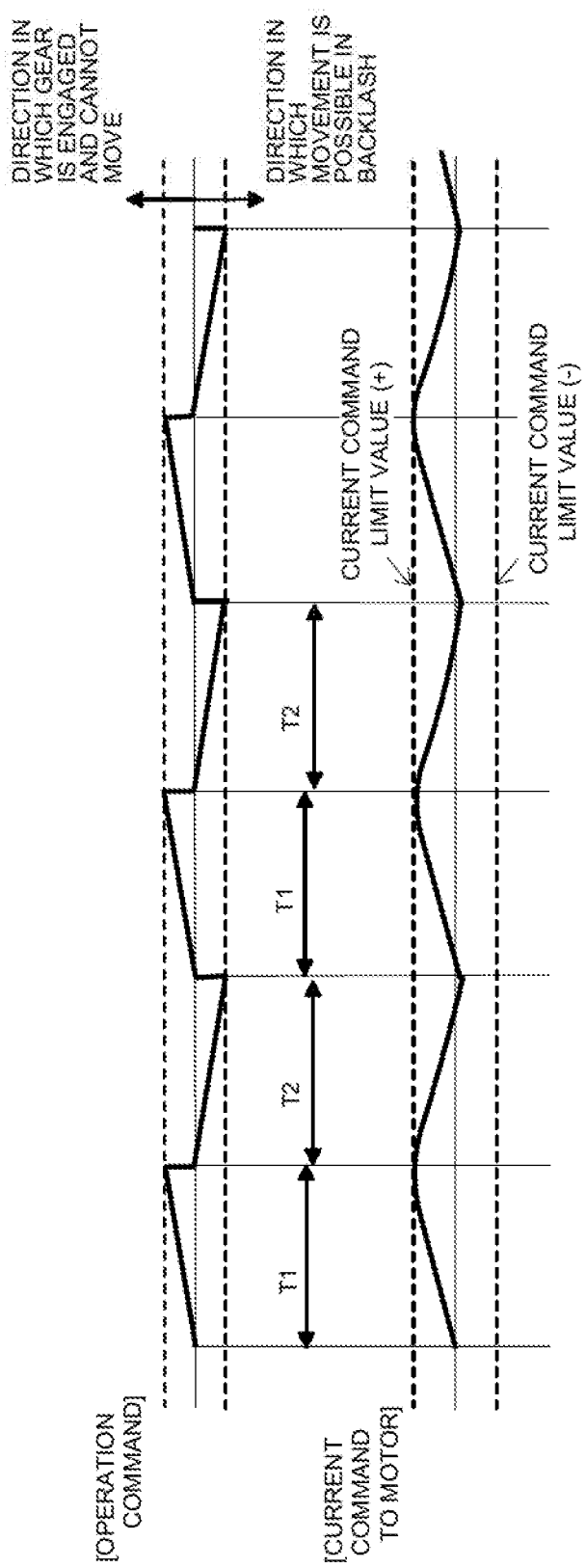

LOCK CONTROL DEVICE OF DRIVE GEAR AND LOCK CONTROL DEVICE OF ACTUATOR

CROSS-REFERENCE TO RELATED APPLICATIONS

This application claims priority of Japanese Patent Application No. 2017-064865 filed on Mar. 29, 2017. The contents of the applications are incorporated herein by reference in their entirety.

BACKGROUND OF THE INVENTION

1. Field of the Invention

The present invention relates to a lock control device of a drive gear and a lock control device of an actuator designed to ensure that a gear train in which the drive gear is locked by an idler gear and a lock gear is unlocked.

2. Description of the Related Art

One known example of this kind of lock control device is described in Japanese Unexamined Patent Application Publication No. 2002-243398, for example. The lock control device includes a drive gear and an idler gear engaged with each other and a lock gear that can move along an axis parallel to axes of the both gears. By attaching a solenoid to the lock gear, the drive gear is pulled into a locked state when the lock gear is simultaneously engaged with the both gears, and the drive gear is released from the locked state when the lock gear is disengaged from at least any one of the both gears. The aforementioned document does not particularly prescribe an operation pattern, and mentions that a lock/unlock operation can be performed by limiting a gear tooth width dimension.

SUMMARY OF THE INVENTION

It is however presupposed that the lock control device in the document is used under a condition that an object to be locked is light-weight or used where it is structurally not necessary to support extreme weight, and it is not assumed that a large load is applied thereto.

That is, if a comparatively large load is applied to an actuator, a weight load is applied to a tooth surface of a gear at an engagement position, and thus, the lock gear is not operated even if it is attempted to directly move the lock gear by the solenoid and the like. Therefore, the gear may not be easily unlocked.

The present invention focuses on the problem set forth above, and an object of thereof is to provide, in a gear train in which the drive gear configured to drive a target object is locked by an idler gear and a lock gear, a lock control device of a drive gear and a lock control device of an actuator designed to ensure that the gear train is unlocked even if a load is applied to the drive gear.

The present invention adopts the following means in order to solve the above-described problem.

That is, in a gear train having a drive gear and an idler gear engaged with each other and a lock gear that can move along an axis parallel to axes of the both gears, the gear train being configured so that the drive gear is locked when the lock gear is simultaneously engaged with the both gears, and the drive gear is unlocked when the lock gear is disengaged from at least any one of the both gears, a lock control device of a drive gear according to the present invention includes: a first drive means configured to linearly drive the lock gear in forward and backward directions; a second drive means configured to rotationally drive the drive gear or the lock gear in normal and reverse directions; and a control means configured to control the both drive means, in which the control means controls the lock gear to start driving at a time of an unlocking operation, from an engagement position toward a disengagement position through the first drive means and when the drive is started, the control means drives the drive gear or the lock gear into one of the normal and reverse directions and into the other direction through the second drive means with a polarity reversal in a predetermined cycle.

With such a configuration, even if a direction into which the drive gear or the lock gear is initially started to operate is a direction in which the gear is engaged with another device so that no movement is possible, the drive gear or the lock gear can be operated into a direction where there is a gap by backlash by reversing the polarity at least at a next cycle. Thus, the lock gear can be pulled out while the gears do not come in contact with each other, and thus, it is possible to ensure that the gear train is unlocked.

In this case, it is particularly preferable that the control means controls the first and second drive means to satisfy an operation condition that a time required for the gear train to operate in the backlash is longer than a time required for the lock gear in a predetermined engaged state to move to a disengagement position (pull out time).

If the drive gear is driven by a main drive mechanism including a main motor and a main feedback circuit of a PI control system configured to generate, in response to an operation command, a current command from a sum of a proportional term and an integration term to input to the main motor, it is effective, to simply realize the present control device, that the control means is configured to control the main drive mechanism as the second drive means and an integration gain obtained at this time is set to a value larger than a value obtained when the gear cannot move and the current command reaches a limit value through the proportional term and the integration term throughout the predetermined cycle.

Further, if the drive gear is driven by the main drive mechanism including the main motor and the main feedback circuit of the PI control system configured to generate, in response to the operation command, the current command from the sum of the proportional term and the integration term to input to the main motor, it is also effective, as another embodiment for easily realizing the present control device, that the control means is configured to control the main drive mechanism as the second drive means and set the integration gain obtained at this time to zero, and set the proportional gain to a value larger than a value obtained when the gear cannot move and the current command reaches the limit value through the proportional term and the integration term throughout the predetermined cycle.

Further, if the drive gear is driven, by the main driving system including the main motor and the main feedback circuit of the PI control system to input the current command to the main motor as the sum of the proportional term and the integration term, it is preferable for the easy control that the control means is configured to rotationally drive the lock gear by controlling an auxiliary drive mechanism including, as the second control means, a motor different from the main motor and an open control circuit different from the main feedback circuit.

If the drive gear is driven by the main motor and configures an actuator configured to take out a rotation of the drive gear to an output axis, it is suitable to use the lock control device of the drive gear as a lock control device of an actuator configured to lock or unlock the output axis of the actuator through the drive gear.

According to the above-described present invention, it is possible to provide, in a gear train in which a drive gear configured to drive a target object is locked by an idler gear and a lock gear, a lock control device of a drive gear and a lock control device of an actuator designed to ensure that the gear train is unlocked even if a load is applied to the drive gear.

BRIEF DESCRIPTION OF THE DRAWINGS

FIG. 3 is a schematic diagram illustrating a control circuit of the lock control device.

FIG. 5 is a diagram illustrating an operation command to the drive gear.

FIGS. 6A to 6E are diagrams illustrating a relationship between backlash, and a rotation of the drive gear and a pullout timing of a lock gear in the embodiment.

FIG. 7 is a supplementary explanatory diagram of FIGS. 6A to 6E.

FIGS. 8A to 8C are explanatory diagrams illustrating an operation state of the gear train.

FIG. 9 is a chart illustrating a relationship between an operation command and a current command when the present control device is not applied.

DETAILED DESCRIPTION OF THE EMBODIMENTS

An embodiment of the present invention will be described below with reference to the drawings.

Figure 1:
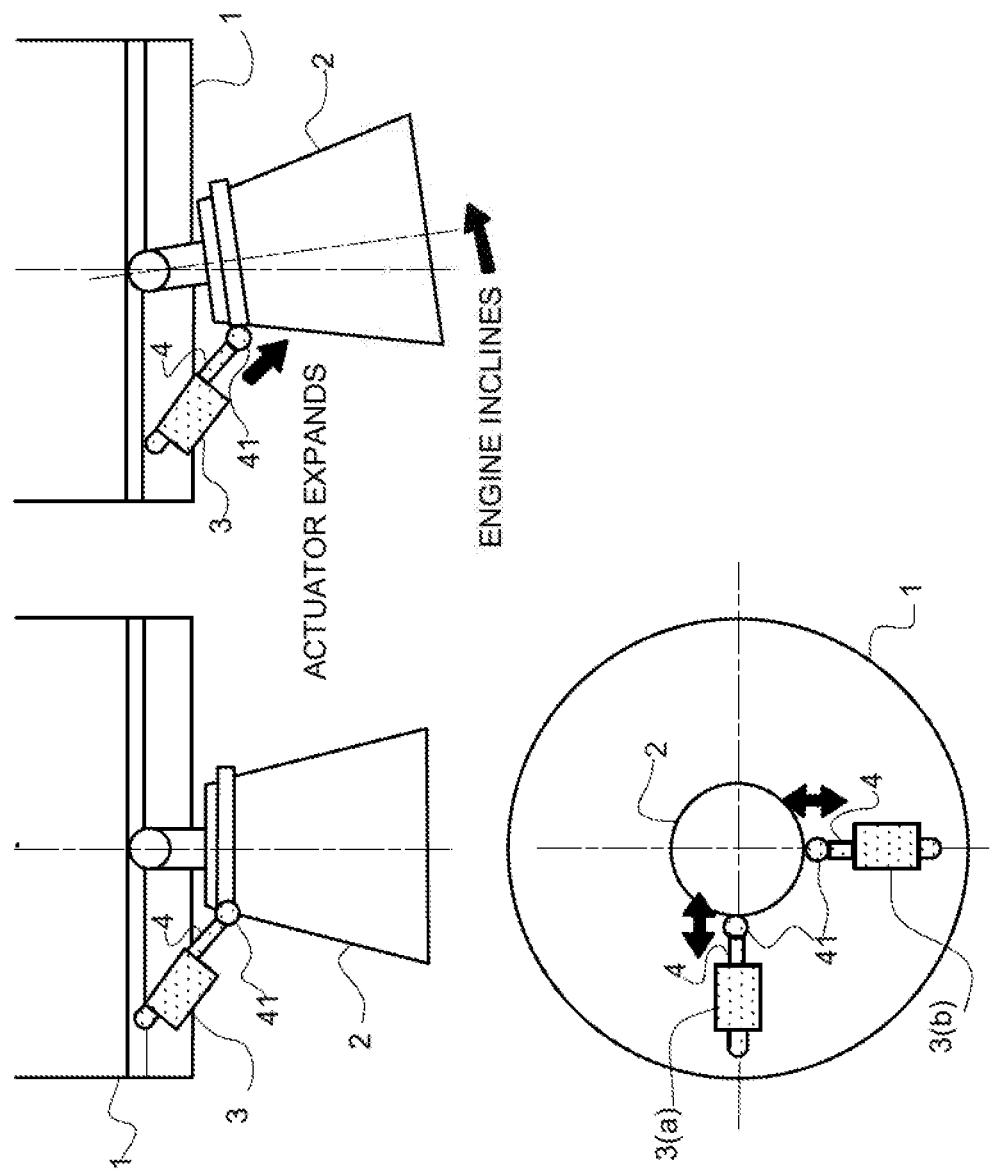
FIG. 1 is a diagram illustrating a surrounding area of an actuator of a flying object employing a lock control device of a drive gear according to an embodiment of the present invention.

FIG. 1 illustrates an actuator 3 employing a lock control device 5. The actuator 3 is for driving an engine 2 attached to a frame body 1 of a flying object. The engine 2 is attached, to permit freely swinging, to the frame body 1, and receives a directional control when driven by actuators 3(*a*) and 3(*b*) from two axial directions.

Figure 2:
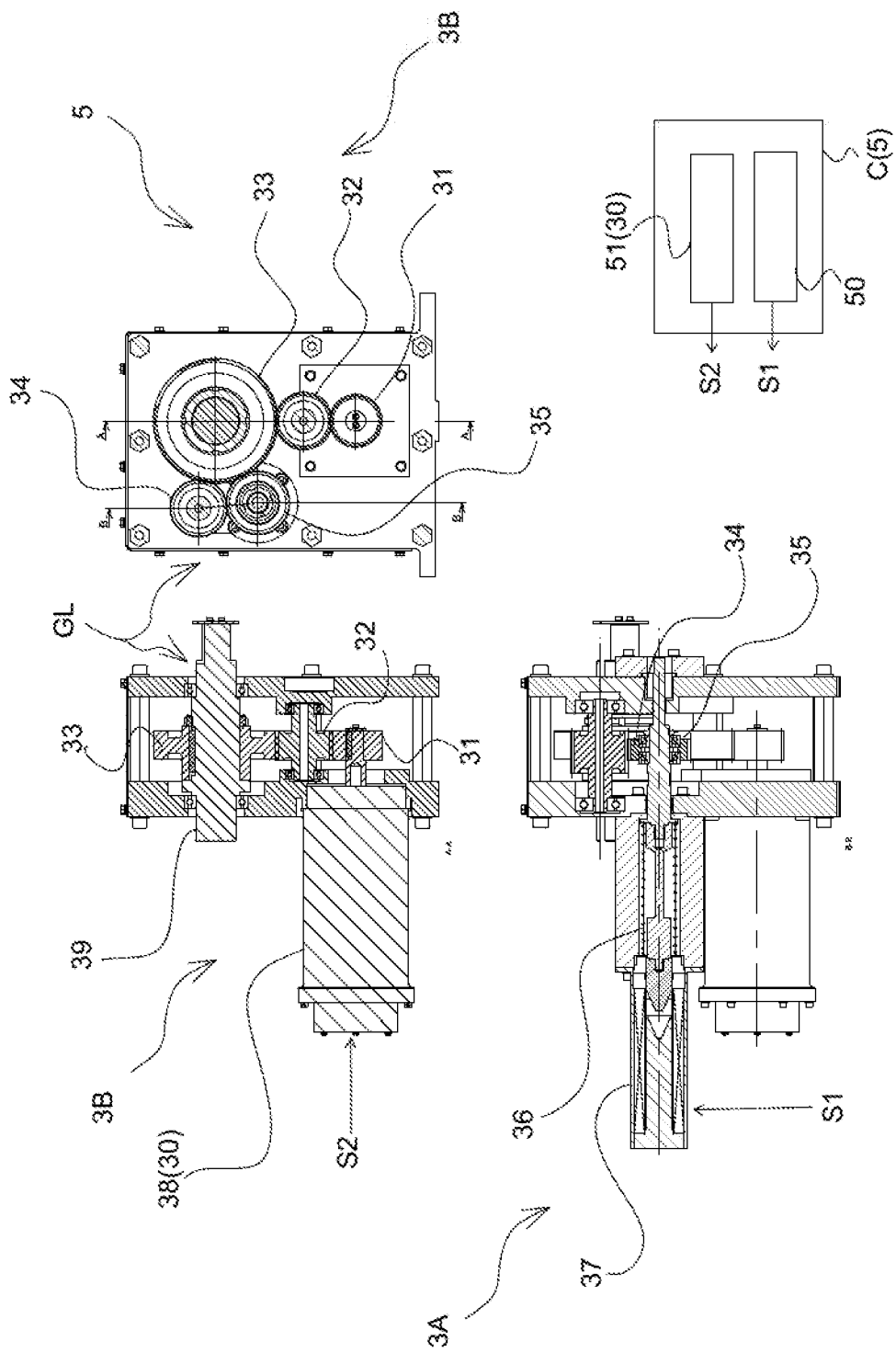
FIG. 2 is a diagram illustrating a configuration of the actuator.

FIG. 2 illustrates the actuator 3. The actuator 3 is provided with a gear train GL in which a drive gear 33 being an output axis gear is engaged, via an idler axis gear 32, with a motor axis gear 31 coupled to a main motor 38. A rotational operation of an output axis 39 rotating integrally with the drive gear 33 is converted, via an operational conversion unit such as a ball screw (not illustrated), into a forward-and-backward operation of an operation rod 4 illustrated in FIG. 1. The operation rod 4 is coupled to the engine 2 via a connector 41.

The main motor 38 configures a main drive mechanism 30 of the actuator 3 by being controlled by a main feedback circuit 51 illustrated in FIG. 2 and FIG. 3. The main feedback circuit 51 is a PI control system configured to sequentially connect, in response to an operation command from a controller c, a speed feedback loop 51(*b*) and a position feedback loop 51(*c*) before a current feedback loop 51(*a*), and add, in each of the loops 51(*a*) to 51(*c*), a value obtained by multiplying proportional gains (K11, K21, and K31) by a deviation between a target value and a current value fed back from each of a current detection unit 38*a*, a speed detection unit 38*b*, and a position detection unit 38*c* of the main motor 38 via feedback gains (G1, G2, and G3); and a value obtained by multiplying predetermined integration gains (K12, K22, and K32) by the deviation in an integration unit to produce a current command. Of course, the main feedback circuit 51 may be configured by any one or a combination of any two of the feedback loops 51(*a*) to (*c*). Further, examples of a specific configuration may include that which has a primary delay element in the integration term and that which has a differential term in addition to the proportional term and the integration term, and the configuration is not limited to the example illustrated in the drawing.

Figure 4A:
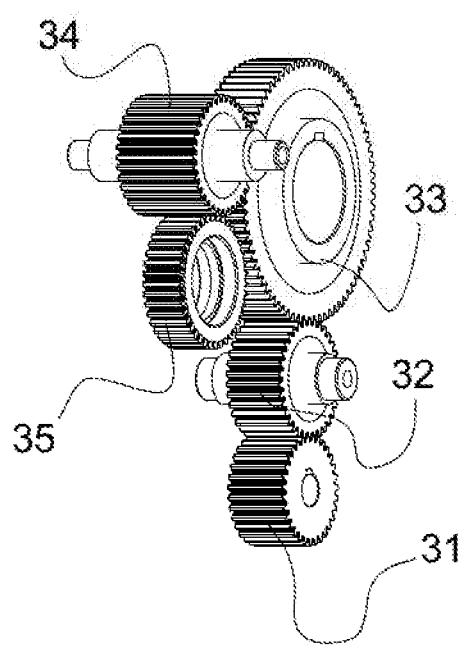
FIGS. 4A and 4B are perspective views illustrating a configuration of a gear train including the drive gear.
Figure 4B:
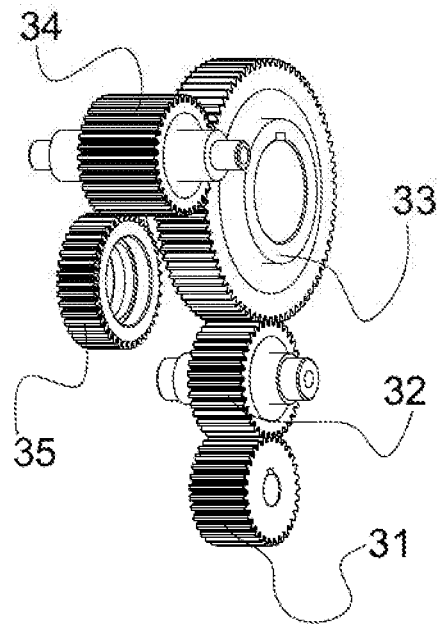

The gear train GL operates to lock the drive gear 33 in a state of FIG. 4A where an idler gear 34 is engaged with the drive gear 33 illustrated in FIG. 2 and the lock gear 35 is further engaged with the both gears, and operates to unlock the drive gear 33 in a state of FIG. 4B where the lock gear 35 is dissociated from the drive gear 33 while maintaining the engaged state with the drive gear 33. Therefore, the lock gear 35 is provided in a manner to move forward and backward between a lock position (a) at which the lock gear 35 is engaged simultaneously with the drive gear 33 and the idler gear 34 and an unlock position (b) at which the drive gear 33 is disengaged while maintaining the engagement with the idler gear 34. Widths of the gears 33 to 35 are set to enable such an operation. Such a linear drive is performed by first drive means 3A illustrated in FIG. 2. The first drive means 3A is configured by including a spring 36 configured to bias the lock gear 35 towards the engagement position and a solenoid 37 configured to drive the lock gear 35 against the spring to the unlock position. The solenoid 37 receives a current command S1 input from a forward-and-backward control circuit 50 of the controller C.

In such a configuration, in an application where the actuator 3 is unlocked for a test from a locked state while the flying object 1 illustrated in FIG. 1 lies or the engine 2 is unlocked immediately after an injection, a load is applied to a tooth surface of each gear 33, 34, and 35 configuring the gear train GL at the time of the unlocking operation, and thus, if continued as is, a large hindrance occurs in the forward-and-backward operation of the lock gear 35 required for unlocking.

Therefore, in the present embodiment, a new function for unlocking is added to the lock control device 5. Utilizing the controller C illustrated in FIG. 2, the lock control device 5 controls the first drive means 3A configured to linearly drive the lock gear 35 in the forward and backward directions through the current command S1 and controls, as second drive means 3B configured to rotationally drive the drive gear 33 in the normal and reverse directions, the main drive mechanism 30 comprised of the main motor 38 and the main feedback circuit 51 through the current command S2.

Through the both drive means 3A and 3B, the lock control device 5 starts driving the lock gear 35, at a time of the unlocking operation, from the engagement position toward the disengagement position through the first drive means 3A. When the drive is started, the lock control device 5 drives the drive gear 33 into one of the normal and reverse directions and drives into the other of the normal and reverse directions through the second drive means 3B with a polarity reversal in a predetermined cycle.

FIG. 5 illustrates an operation command input to the feedback circuit 51 within the controller C, to the second drive means 3B of the above-described drive means. The operation command of the embodiment is, in a way, a saw-like wave form having bipolarity. In response to the operation command, the current command is generated from a sum of proportional terms (gains: K11, K21, K31) and integration terms (gains: K12, K22, K32) of the feedback circuit 51 illustrated in FIG. 3, and the operation command is reversed in a predetermined cycle. During this time, a pull out operation is applied to the first drive means 3A through a current command S1 input from the forward-and-backward control circuit 50 within the controller C to the solenoid 37.

FIG. 6A is a conceptual diagram illustrating a behavior of the drive gear 33 and the lock gear 35 at the time. There is backlash between the drive gear 33 and the lock gear 35 at a position on an imaginary line in FIG. 6A where the lock gear 35 is engaged with the drive gear 33. A maximum movable range of the drive gear 33 in the normal and reverse directions is a value obtained by adding an amount of backlash between the drive gear 33 and the idler gear 34 toward a direction in which the load is not applied and an amount of backlash between the idler gear 34 and the lock gear 35. On the other hand, a minimum movable range is zero toward a direction in which the load is applied.

When driven from the position illustrated in FIG. 6A to the right side of the figure, the drive gear 33 can move by the amount of the backlash until bumping into the tooth surface of a lock gear 35(a) positioned on the right side; however, if driven to the left side, the drive gear 33 bumps into the tooth surface of the lock gear 35(a) positioned on the left side of the drive gear 33 and cannot move any farther.

In FIG. 6B, if the drive gear 33 is previously driven toward left where a horizontal axis is a time and a vertical axis is an input amplitude, there is backlash in a negative direction, and thus, the drive gear 33 can only start to move at least after the operation command has been reversed.

In FIG. 6C, if the drive gear 33 is previously driven toward right where the horizontal axis is the time and the vertical axis is the input amplitude, there is backlash in a positive direction, and thus, the drive gear 33 can immediately start moving by the operation command.

However, if the amplitude is too large, a time for moving in the backlash shortens as illustrated in FIG. 6D and FIG. 6E, and thus, if the time is shorter than the pull out time of the lock gear 35, the drive gear 33 bumps into the tooth surface of the lock gear 35 on the opposite side again and then the lock gear 35 cannot be pulled out.

Thus, the controller C being the lock control means is set to control the first drive means 3A and the second drive means 3B to at least satisfy an operation condition that a time required by the gear train GL to operate in the backlash is longer than a time required by the lock gear 35 in a predetermined engaged state (a) to move to a disengagement position (b). In addition, if there is a request to quickly perform the unlocking, the lock gear 35 completing the unlocking within a previously determined limit time is added to the operation condition.

Here, reasons for setting the gear operation amount will be described based on FIG. 7 to FIG. 8C.

(1) A purpose of operating the drive gear 33 in the motor 38 when unlocking is to change a state where a gear-to-gear load occurs (see FIG. 8A) to a state where the gear-to-gear load has been released (see FIG. 8B).

(2) The lock is canceled if the lock gear 35 is moved in the axis direction and the three gears 33, 34, and 35 are disengaged in a state where the gear-to-gear load has been released (see FIG. 8B).

(3) As a technique for moving the lock gear 35 in the axis direction, pulling out by the solenoid 37 (see FIG. 2) is used; however, there is a certain constant time required for movement. The time required for the movement of the lock gear 35 is determined by a mass of the lock gear 35, a power of a return spring 36, a pull out power, a resistance of a coil configuring the solenoid 37, and an inductance of the coil, and thus, the time required cannot be omitted.

(4) If a time for maintaining a state where the gear-to-gear load is released (see FIG. 8B) is longer than the time required for the movement of the lock gear 35, it is possible to perform the unlocking.

(5) A contact state of the gear is either a state of FIG. 8A or a state of FIG. 8C (state where the gear is in contact with a different contact surface). Therefore, the lock gear 35 needs to operate in both the normal-and-reverse directions of the drive gear 33, and the time required for unlocking TL [s] is indicated by the following equation, by using a motor operation speed 1/Vm [s/mm] and an amount of the gear operation L [mm].

$$TL = Vm \times L \times 2 \qquad (1)$$

$$Vm = TL/(2 \times L) \qquad (2)$$

(6) A time Tk [s] for maintaining a state where the gear-to-gear load is released is indicated by the following equation by using a motor operation speed [1/Vms/mm] and backlash B [mm] of the gear train GL.

$$Tk = Vm \times B \qquad (3)$$
$$= TL \times B/(2 \times L)$$

(7) A condition that the lock gear 35 can be moved is indicated by the following equation by using the time Tk [s] for maintaining the state in which the gear-to-gear load is released and the time required Ts [s] of the movement of the lock gear 35.

$$Ts < Tk \qquad (4)$$

When substituting the equation (3), $$Ts < TL \times B/(2 \times L) \qquad (5)$$

$$L < TL \times B/(2 \times Ts) \qquad (6)$$

In the present embodiment, to fulfill such conditions, there is a specific relationship among parameters related to a width of the backlashes of the gear train GL.

If a direction in which the drive gear 33 is initially started to operate is a direction (=end of backlash) in which the drive gear 33 is engaged and cannot move, the current command value S2 to the motor 38 rises up to a limit during a duration T1 as illustrated in FIG. 9. The reason for the rise is that if an integration term is used for the main feedback control 30 as illustrated in FIG. 3 to improve the followability of a large load, the drive gear 33 cannot operate, and thus, a deviation between an operation command value and a current position is integrated as the integration terms. Thereafter, the command reverses upon entering the duration T2; however, it takes too much time to cancel the accumulated integration terms, and thus, either the current command value S2 does not reach the opposite direction or reaches, if at all, a latter half of the duration T2. As a result, the duration T2 ends before the command reaches a position needed for unlocking. Thus, a situation arises in which unlocking cannot be performed.

Figure 10:
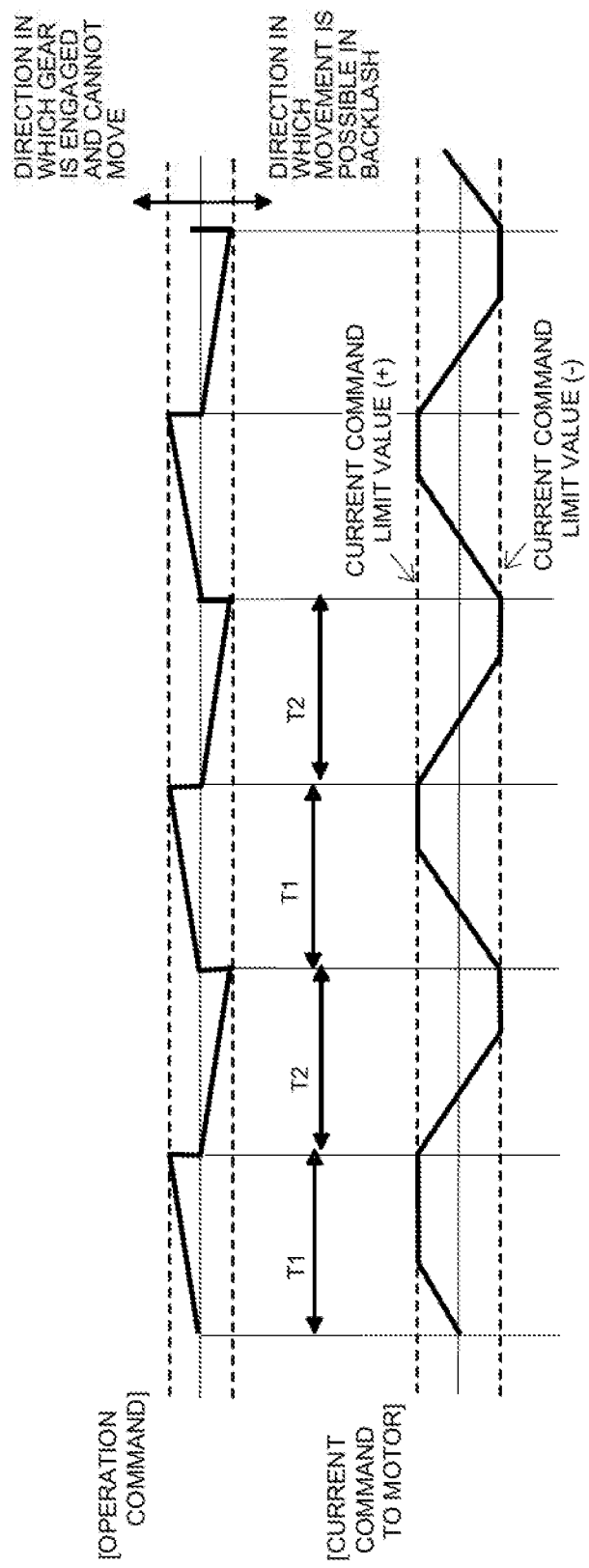
FIG. 10 is a chart illustrating a relationship between the operation command and the current command by the present control device.

To solve this problem, the above-described specific relationship is given to the widths of the backlash of the gear train GL, and in addition, a current command pattern as illustrated in FIG. 10 is generated in response to the operation command so as to ensure that the lock gear 35 can operate even in a state where the load is applied.

This current command pattern is obtained when the integration gains K12, K22, and K32 indicated in FIG. 3 are set to a value larger than an integration gain value (see FIG. 9) at a time of a normal drive when the gear train GL cannot move and the current command reaches a previously set limit value through the proportional term and the integration term throughout the predetermined cycle.

A specific example includes a mode in which the drive gear 33 is set to 10 to 20 times the integration gain K12 at the time of the normal drive. Thus, relative to the pattern of FIG. 9, in the pattern of FIG. 10, the slope of the current command S2 is large, and the current command S2 reaches the limit value immediately after starting the operation and does not increase any further. When the operation command reverses and declines after the cycle T1, an accumulation of the integration gain is small and the slope is large, and thus, the current command S2 immediately begins to decline. Then, the drive gear 33 is allowed to move by the amount of backlash toward the opposite side until the end of the duration T2. Therefore, even if the drive gear 33 is previously driven in a direction to which the load is applied, it is possible to ensure that the drive gear 33 does not come into surface contact in the next cycle T2.

Such a setting and modification of the integration gain can be realized by a gain setting command sent from the controller C to the feedback circuit 51.

Therefore, in the gear train having the drive gear 33 and the idler gear 34 engaged with each other and the lock gear 35 capable of moving along an axis parallel to an axis of the both gears 33, 34, the gear train being configured so that the drive gear 33 is locked when the lock gear 35 is simultaneously engaged with the both gears 33, 34 and the drive gear 33 is unlocked when the lock gear 35 is disengaged from at least any one of the both gears 33, 34, that is, in the present embodiment, the drive gear 33, the lock control device of the present embodiment includes: the first drive means 3A configured to linearly drive the lock gear 35 in the forward and backward directions; the second drive means 3B configured to rotationally drive the lock gear 35 in the normal and reverse directions; and the controller C being control means configured to control the both drive means 3A, 3B. In the lock control device, the control means 5 starts driving the lock gear 35 at the time of the unlocking operation, from an engagement position (a) toward a disengagement position (b) through the first drive means 3A. When the drive is started, the control means 5 drives the drive gear 33 into one of the normal and reverse directions and into the other direction, through the second drive means 3B, with a polarity reversal in a predetermined cycle.

With such a configuration, even if a direction into which the drive gear 33 is initially started to operate is a direction in which the gear 33 is engaged with another gear so that no movement is possible in the first cycle T1, the drive gear 33 can be operated into a direction where there is a gap by the backlash if the polarity is reversed at least in the next cycle T2. Thus, the lock gear 35 can be pulled out while the gears 33 and 35 do not come in contact with each other, and thus, it is possible to ensure the unlocking.

Particularly, the controller C being the control means controls the first drive means 3A and the second drive means 3B to satisfy the operation condition that the time required by the gear train GL to operate in the backlash is longer than the time required by the lock gear 35 to move from a predetermined engagement position (a) to a disengagement position (b), and further as needed, to satisfy an operation condition that the lock gear 35 completes the unlocking within a previously set limit time. This ensures a setting that can prevent the gears from coming in contact with each other during the pull out of the lock gear 35.

Further, the drive gear 33 is driven by the main drive mechanism 30 including the main motor 38 and the main feedback circuit 51 of a PI control system configured to generate, in response to the operation command, the current command S2 from the sum of the proportional term and the integration term to be input to the main motor 38. The controller C being the control means controls the main drive mechanism 30 as the second drive means, and controls by setting the integration gains K12 to K32 at that time to a value larger than a value obtained when the drive gear 33 cannot move and the current command reaches the limit value through the proportional term and the integration term throughout the predetermined cycle.

As described above, if the PI control is used, there is a case that the current command S2 remains as integrated when the gear train GL cannot move and the deviation is not resolved, and the current command is not immediately turned into the reverse direction current command even if the polarity is reversed. On the other hand, if the system is configured as described above, the slope of the current command S2 increases and the current command reaches the limit value immediately after the operation start and does not further increase. When the current command decreases, an accumulation of the current command S2 is small and the slope is large, and thus, the current command S2 can immediately begin to decrease. As a result, it is possible to ensure that the lock gear 35 can perform the unlocking while preventing a slow operation of the drive gear 33. In addition, the existing main drive mechanism 30 is utilized, and thus, it is not necessary to additionally introduce a new mechanism element.

Further, the drive gear 33 is driven by the main motor 38 and configures the actuator 3 configured to take out the rotation of the drive gear 33 to the output axis 39. The lock control device 5 of the drive gear 33 is used as the lock control device of the actuator 3 configured to lock or unlock the output axis 39 of the actuator 3 through the drive gear 33. As a result, the present invention may be highly useful when applied to an object to be controlled that receives a large load when being locked such as the flying object illustrated in FIG. 1.

Although an embodiment of the present invention was explained above, the specific configuration of each unit is not limited only to those in the embodiment described above.

For example, in the above-described embodiment, the controller C being the control means controls the main drive mechanism 30 as the second drive means and controls by setting the integration gains K11 to K33 obtained at this time to a value larger than a value obtained when the drive gear 33 cannot move and the current command reaches the limit value through the proportional term and the integration term throughout the predetermined cycle. However, in the controller C, the integration gain may be set to zero, and the proportional gains K11 to K13 may be set to a value larger than a value when the drive gear 33 cannot move and the current command reaches the limit value through the proportional term and the integration term throughout a predetermined cycle. In this case, configuration is that in addition to the setting and the modification of the integration gain, those of the proportional gain may be realized by the gain setting command sent from the control means C to the feedback circuit 51.

Figure 11:
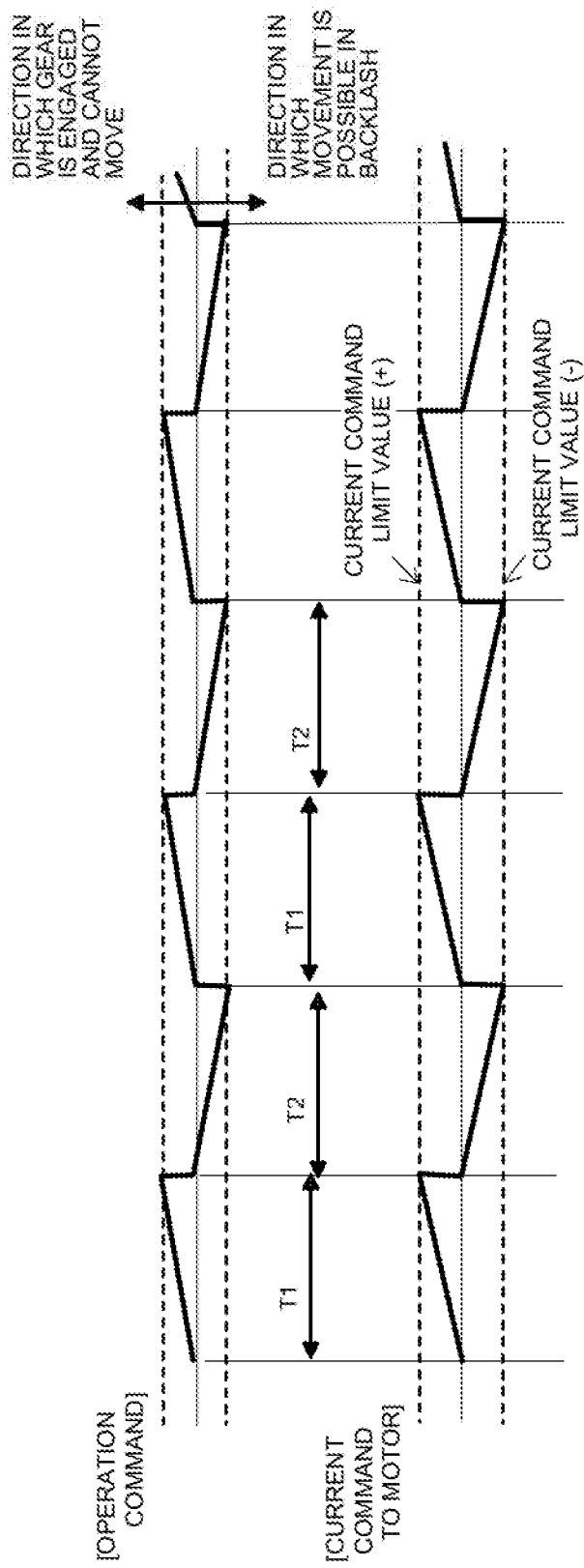
FIG. 11 is a chart illustrating a relationship between an operation command and a current command by the control device according to a modification of the present invention.

With such a configuration, as illustrated in FIG. 11, the proportional gains K11 to K13 are large while the integration value is zero, and thus, the current command S2 effectively rises toward the limit value. When the current command S2 decreases, the current command S2 is immediately reversed because there is no integration term, and the proportional gain is also large, and therefore, the current command S2 effectively rises toward a negative limit value. As a result, it is possible to ensure that the unlocking of the lock gear 35 is realized while preventing a slow operation of the drive gear 33. In addition, the existing main drive mechanism 30 is also utilized in this case, and thus, it is not necessary to separately introduce a new mechanism element.

Figure 12:
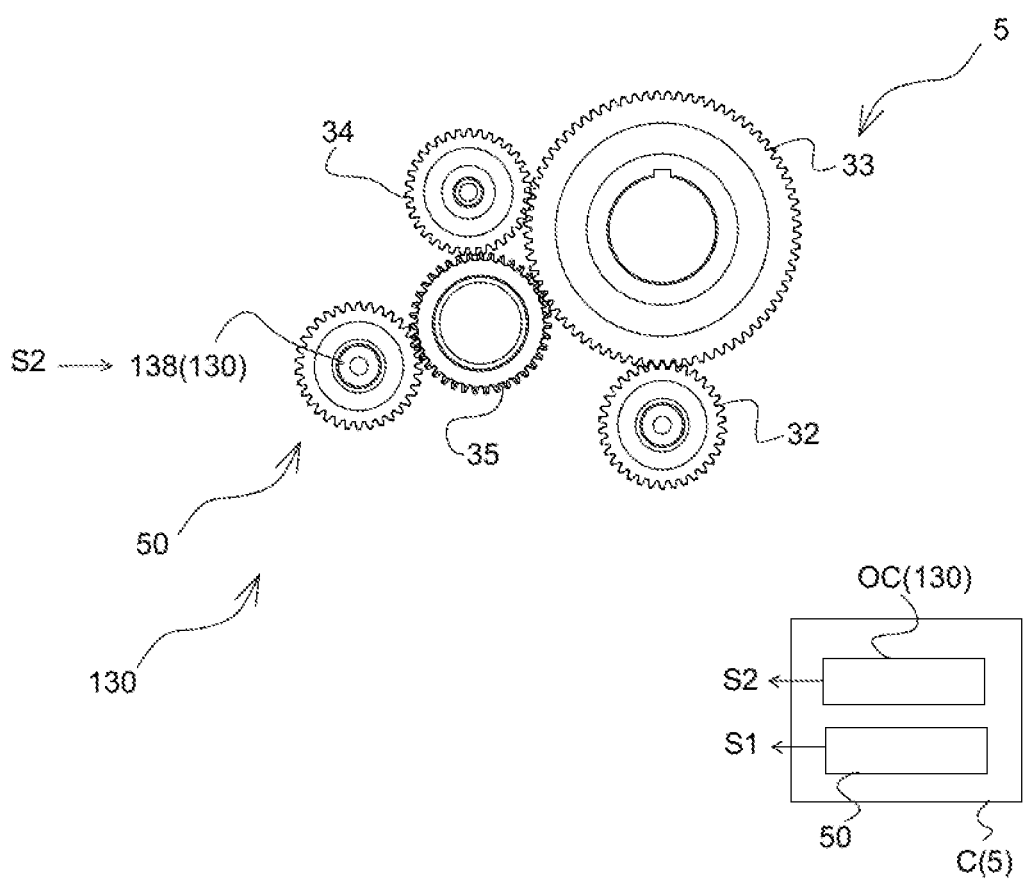
FIG. 12 is a diagram illustrating a control device according to another modification of the present invention.

Further, in the above-described embodiment, for example, the controller C being the control means utilizes and controls the main drive mechanism 30 as the second drive means. Instead, as illustrated in FIG. 12, another configuration may be that an auxiliary drive mechanism 130 is adopted, as the second control means, which includes a motor 138 different from the main motor 38 and an open control circuit OC different from the main feedback circuit 51, and the controller 5 being the lock control device controls the auxiliary drive mechanism 130 to perform the pull out operation while allowing the lock gear 35 to perform a reciprocal rotation between the backlash gap of the drive gear 33. In this case, if the lock gear 35 is engaged with any one of the gears at a time of the unlocking, a clutch or the like should be arranged between the motor 138 and the gear.

This results in the auxiliary drive mechanism 130 being newly and additionally added; however, it is possible to easily perform the control of the lock gear 35 itself when pulling out the lock gear 35.

Further, in the above-described embodiment, the drive gear is configured to be unlocked in the first cycles T1 and T2; however, depending on a limit time restriction required for the unlocking, the unlocking may be realized by repeating the unlocking a plurality of number of times.

Further, various other changes may be applied to the waveform of the operation command and the like without departing from the spirit scope of the present invention.

REFERENCE SIGNS LIST

3 . . . Actuator
30 . . . Main drive mechanism
33 . . . Drive gear
34 . . . Idler gear
35 . . . Lock gear
38 . . . Main motor
3A . . . First drive means (linear drive)
3B . . . Second drive means (rotational drive)
5 . . . Lock control device (controller)
51 . . . Feedback circuit
51(a) . . . Current feedback loop
51(b) . . . Speed feedback loop
51(c) . . . Position feedback loop
130 . . . Auxiliary drive mechanism

What is claimed is:

1. A lock control device of a drive gear, the drive gear being applied in a gear train,
the gear train having: the drive gear and an idler gear engaged with each other; and a lock gear capable of moving along an axis parallel to axes of the both gears, the gear train being configured so that the drive gear is locked when the lock gear is simultaneously engaged with the both gears and the drive gear is unlocked when the lock gear is disengaged from at least any one of the both gears,
the lock control device, comprising: a first drive means configured to linearly drive the lock gear in forward and backward directions; a second drive means configured to rotationally drive the drive gear or the lock gear in normal and reverse directions; and control means configured to control the both drive means, wherein
the control means is configured to drive the lock gear at a time of unlocking operation, from an engagement position toward a disengagement position through the first drive means and when the drive is started, drives the drive gear or the lock gear toward one of normal and reverse directions and toward the other direction through the second drive means, with a polarity reversal in a predetermined cycle.

2. The lock control device of the drive gear according to claim 1, wherein the control means controls the first and second drive means to satisfy an operation condition that a time required by the gear train to operate in the backlash is longer than a time required by the lock gear in a predetermined engaged state to move to a disengagement position.

3. The lock control device of the drive gear according to claim 2, wherein the drive gear is driven by a main drive mechanism including a main motor and a main feedback circuit of a PI control system configured to generate, in response to an operation command, a current command from a sum of a proportional term and an integration term to input to the main motor, wherein
the control means controls the main drive mechanism as the second drive means and sets an integration gain obtained at this time to a value larger than a value obtained when the gear cannot move and a current command reaches a limit value through the proportional term and the integration term throughout the predetermined cycle.

4. A lock control device of an actuator according to claim 3, wherein the drive gear is driven by the main motor and configures an actuator configured to take out rotation of the drive gear to an output axis, and uses the lock control device to lock or unlock the output axis of the actuator through the drive gear.

5. The lock control device of the drive gear according to claim 2, wherein the drive gear is driven by a main drive mechanism including a main motor and a main feedback circuit of a PI control system configured to generate, in response to an operation command, a current command from a sum of a proportional term and an integration term to input to the main motor, wherein
the control means controls the main drive mechanism as the second drive means and sets an integration gain obtained at this time to zero while setting the proportional gain to a value larger than a value when the gear cannot move and the current command reaches a limit value through the proportional term and the integration term throughout the predetermined cycle.

6. A lock control device of an actuator according to claim 5, wherein the drive gear is driven by the main motor and configures an actuator configured to take out rotation of the drive gear to an output axis, and uses the lock control device to lock or unlock the output axis of the actuator through the drive gear.

7. A lock control device of an actuator according to claim 2, wherein the drive gear is driven by the main motor and configures an actuator configured to take out rotation of the drive gear to an output axis, and uses the lock control device to lock or unlock the output axis of the actuator through the drive gear.

8. A lock control device of an actuator according to claim 1, wherein the drive gear is driven by the main motor and configures an actuator configured to take out rotation of the drive gear to an output axis, and uses the lock control device to lock or unlock the output axis of the actuator through the drive gear.

* * * * *